(12) United States Patent
Laine

(10) Patent No.: US 11,820,181 B2
(45) Date of Patent: Nov. 21, 2023

(54) METHODS FOR ASSISTING AUTOMATIC UNCOUPLING/COUPLING OF A TRAILER

(71) Applicant: VOLVO TRUCK CORPORATION, Gothenburg (SE)

(72) Inventor: Leo Laine, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 896 days.

(21) Appl. No.: 16/487,311

(22) PCT Filed: Mar. 6, 2017

(86) PCT No.: PCT/EP2017/055179
§ 371 (c)(1),
(2) Date: Aug. 20, 2019

(87) PCT Pub. No.: WO2018/162031
PCT Pub. Date: Sep. 13, 2018

(65) Prior Publication Data
US 2020/0055357 A1   Feb. 20, 2020

(51) Int. Cl.
B60D 1/36   (2006.01)
B60D 1/58   (2006.01)
B62D 15/02  (2006.01)

(52) U.S. Cl.
CPC ............... B60D 1/36 (2013.01); B60D 1/58 (2013.01); B62D 15/02 (2013.01)

(58) Field of Classification Search
CPC . B60D 1/36; B60D 1/58; B60D 1/465; B62D 15/02
See application file for complete search history.

(56) References Cited

U.S. PATENT DOCUMENTS

| 2,123,820 A | 7/1938 | Winn |
| 5,142,278 A | 8/1992 | Moallemi et al. |
| 8,308,182 B2 | 11/2012 | Ortmann et al. |

(Continued)

FOREIGN PATENT DOCUMENTS

| AT | 518246 B1 * | 9/2017 |
| CN | 1795121 A | 6/2006 |

(Continued)

OTHER PUBLICATIONS

China Office Action dated Jul. 5, 2021 in corresponding China Patent Application No. 201780087968.4, 10 pages.

(Continued)

*Primary Examiner* — Jacob D Knutson
(74) *Attorney, Agent, or Firm* — Venable LLP; Jeffri A. Kaminski

(57) ABSTRACT

The invention i.a. relates to a method comprising the steps of: parking (S1) a trailer (12) by means of a towing vehicle (10), which trailer (12) is coupled to the towing vehicle (10) via a coupling element (32) of the trailer (12); the towing vehicle (10) estimating (S2) position and heading of the coupling element (32) of the parked trailer (12); transmitting (S3) the estimated position and heading of the coupling element (32) of the parked trailer (12) to a data storage device (34, 42); and automatically uncoupling (S5) the trailer (12) from the towing vehicle (10), so that the towing vehicle (10) can drive away from the parked trailer (12).

20 Claims, 8 Drawing Sheets

(56) References Cited

U.S. PATENT DOCUMENTS

| | | |
|---|---|---|
| 9,409,510 B1 | 8/2016 | Feagan |
| 2003/0122347 A1* | 7/2003 | Walters .................. B60D 1/66 280/475 |
| 2007/0027581 A1 | 2/2007 | Bauer et al. |
| 2010/0085215 A1 | 4/2010 | Doyle, III |
| 2012/0259482 A1* | 10/2012 | Jeschke ................ G05D 1/0234 414/800 |
| 2016/0139599 A1 | 5/2016 | Czlapinski et al. |
| 2016/0361959 A1 | 12/2016 | Keatley et al. |
| 2016/0368336 A1* | 12/2016 | Kahn .............. B60W 30/18036 |

FOREIGN PATENT DOCUMENTS

| | | | |
|---|---|---|---|
| CN | 102695994 A | 9/2012 | |
| CN | 105082910 A | 11/2015 | |
| CN | 105264451 A | 1/2016 | |
| CN | 105377592 A | 3/2016 | |
| DE | 19526702 C2 | 8/2001 | |
| DE | 102007048069 A1 * | 4/2009 | .............. B60D 1/36 |
| DE | 102010035299 A1 | 2/2012 | |
| EP | 2987663 A1 * | 2/2016 | ............ B60D 1/015 |
| EP | 2987663 A1 | 2/2016 | |
| JP | 2001287833 A | 10/2001 | |
| JP | 2004185057 A | 7/2004 | |
| JP | 2006221278 A | 8/2006 | |
| JP | 2008509869 A | 4/2008 | |
| JP | 2008539114 A | 11/2008 | |
| WO | 0224499 A1 | 3/2002 | |
| WO | 2005080179 A1 | 9/2005 | |
| WO | 2006114197 A1 | 11/2006 | |
| WO | 2014185828 A1 | 11/2014 | |
| WO | WO-2014185828 A1 * | 11/2014 | ............ B62D 13/06 |
| WO | 2015005795 A2 | 1/2015 | |

OTHER PUBLICATIONS

International Search Report dated Nov. 28, 2017 in International Application No. PCT/EP2017/055179.
International Preliminary Report on Patentability dated Jun. 14, 2019 in International Application No. PCT/EP2017/055179.
Japan Office Action dated Feb. 2, 2021 in corresponding Japan Patent Application No. 2019-547647, 12 pages.
European Communication pursuant to Article 94(3) EPC, dated Nov. 13, 2020, in corresponding European Patent Application No. 17709048.7, 4 pages.
Brazil Office Action dated Oct. 16, 2021 in corresponding Brazil Patent Application No. BR112019018315-9, 4 pages.
European Opposition dated Sep. 16, 2022 in corresponding European Application No. 17709048.7, 47 pages.

* cited by examiner

METHODS FOR ASSISTING AUTOMATIC UNCOUPLING/COUPLING OF A TRAILER

TECHNICAL FIELD

The invention relates to methods for assistance in conjunction with automatic uncoupling/coupling of a trailer. The present invention also relates to a computer program, computer readable medium, a control unit, and a vehicle.

The invention can be applied in heavy-duty vehicles, such as trucks and construction equipment.

BACKGROUND

In towing vehicle and trailer combinations today, parking and uncoupling the trailer from the towing vehicle, as well as picking up a trailer and couple it to a towing vehicle, is usually done manually by the driver.

Already now, automatic trailer couplings are available, for example VBG MFC (Multi Function Coupling) from VBG and KKS Comfort Coupling System from JOST. These couplings automatically connect electricity, air, and communication connectors. However, for both these automatic trailer couplings, the driver has to manually position the towing vehicle relative to the trailer before automatic coupling can be initiated.

SUMMARY

An object of the invention is to provide an improved method, which method in particular may allow further automation in conjunction with automatic uncoupling/coupling of a trailer.

According to a first aspect of the invention, the object is achieved by a method according to claim 1. According to a second aspect of the invention, the object is achieved by a method according to claim 17.

According to the first aspect of the invention, there is provided a method comprising the steps of: parking a trailer by means of a towing vehicle, which trailer is coupled to the towing vehicle via a coupling element of the trailer; the towing vehicle estimating position and heading of the coupling element of the parked trailer; transmitting the estimated position and heading of the coupling element of the parked trailer to a data storage device; and automatically uncoupling the trailer from the towing vehicle, so that the towing vehicle can drive away from the parked trailer. The method may further comprise the steps of: receiving in a towing vehicle the position and heading of the coupling element of the parked trailer from the data storage device; based on the received position and heading of the coupling element of the parked trailer, positioning the towing vehicle in a position in which the parked trailer can be automatically coupled to the towing vehicle; automatically coupling the trailer to the towing vehicle; and driving away the trailer by means of the towing vehicle.

The towing vehicle picking up the trailer may be the same as the towing vehicle that parked the trailer, or it may be a different towing vehicle.

Examples of towing vehicle and trailer combinations within the context of the invention include, but are not limited to:

| towing vehicle | trailer |
| --- | --- |
| tractor | semi-trailer |
| autonomous (driverless, self-driving) dolly | semi-trailer |
| truck | full trailer |
| truck | converter dolly + semi-trailer |
| truck + converter dolly | semi-trailer |
| truck | centre-axle trailer |
| tractor + semi-trailer | full trailer |
| tractor | semi-trailer + full trailer |

The invention is based on the understanding that by estimating and storing the position and heading of the parked trailer's coupling element, this information can be used by a towing vehicle to automatically find and approach the trailer, in order to perform automatic coupling.

It should be noted that US2010/0085215 discloses that a pin location of a trailer is determined by the current antenna location of an antenna associated with an integrated wireless equipment management system. The pin location also is determined by data concerning the last direction of movement of the trailer, as well as by the pin offset distance from the antenna. However, the pin location of an intended trailer and the slide location of an intended tractor is in US2010/0085215 determined at an authentication step. If the reported pin location and slide location begin movement in unison, pairing (a physical coupling) is conclusively validated.

Positioning the towing vehicle in a position in which the parked trailer can be automatically coupled to the towing vehicle may include automatically controlling at least steering of the towing vehicle when reversing the towing vehicle towards the parked trailer. This may for example be achieved as described in WO 2014/185828 A1, the content of which herein is incorporated by reference. Parking the trailer by means of the towing vehicle may also include automatically controlling at least steering of the towing vehicle when reversing the towing vehicle in order to park the trailer.

The coupling element of the trailer may be a kingpin. The kingpin may be coupled to a fifth wheel on the towing vehicle (fifth-wheel coupling). The 'heading' of the coupling element in case it is a kingpin may be construed as the heading of the trailer, i.e. the direction in which the trailer points.

The coupling element of the trailer may be a drawbar coupling element. The drawbar coupling element may for example be a drawbar eye. The 'heading' of the coupling element in case it is a drawbar coupling element may be construed as the heading of a drawbar which the drawbar coupling element is attached to or forms part of.

The position and the heading of the coupling element of the parked trailer may be estimated based on the heading of a foremost unit of the towing vehicle, the position of a part of the foremost unit of the towing vehicle, a vehicle model representing the towing vehicle and the trailer, and at least the articulation angle between the towing vehicle and the trailer as detected by at least one articulation angle detection means. The position of the coupling element may be calculated using trigonometry, and the heading may be calculated by adding/subtracting the articulation angle to/from the heading of the foremost unit of the towing vehicle. The foremost unit of the towing vehicle may for example be the tractor in case the towing vehicle is a tractor+semi-trailer. In case the towing vehicle is only a tractor or an autonomous dolly, the tractor or the autonomous dolly is the foremost unit of the towing vehicle. Furthermore, in case the towing vehicle itself is an articulated vehicle, like a tractor+semi-trailer, an additional articulation angle may be included in the estimation of the position and heading of the parked trailer's coupling element, namely the articulation angle between the tractor and the semi-trailer. In another case with a truck and a converter dolly+semi-trailer, wherein the semi-trailer is parked without the converter dolly, except the articulation angle between the converter dolly and semi-trailer, also the articulation angle between the truck and the converter dolly may be included in the estimation. The at least one articulation angle detection means may be provided on the towing vehicle.

The vehicle model may be a linear single track vehicle model in which at least one wheelbase and at least the coupling position between the towing vehicle and the trailer are defined. Such a vehicle model is known per se, see for example the aforementioned WO 2014/185828 A1. The at least one wheelbase may be at least one equivalent wheelbase. The coupling position may be expressed as a linear distance relative to the equivalent wheelbase of for example the towing vehicle. The linear single track vehicle model may include at least one additional coupling position, for example if the towing vehicle is an articulated vehicle such as a tractor+semi-trailer.

The heading of the foremost unit of the towing vehicle and the position of the part of the foremost unit of the towing vehicle may be determined by a navigation system of the towing vehicle. The navigation system may for example be a GPS (Global Positioning System) navigation system. Such a system is typically readily available in the towing vehicle. The location accuracy of the navigation system may be improved, for example by means of a DGPS (Differential Global Positioning System) reference station. The location accuracy of the navigation system may for example be improved to an accuracy of +/−5 cm.

The heading of the foremost unit of the towing vehicle and the position of the part of the foremost unit of the towing vehicle may also be determined by means of map localization using at least one sensor on the towing vehicle. This may be useful in case a GPS signal is not available, like underground or in roof covered areas, or if the GPS signal is not accurate enough. The at least one sensor may for example be a plurality of surrounding sensors adapted to read the environment of the towing vehicle, wherein the towing vehicle may be configured to compare the reading with a pre-recorded map of the environment to determine or estimate where the towing vehicle is positioned and in what direction it is pointing (i.e. the heading). The at least one sensor may include at least one of lidar and camera.

The method may further comprise the step of estimating the height of the coupling element of the parked trailer before automatically uncoupling the trailer from the towing vehicle, wherein the height is stored in the data storage device along with said position and heading of the coupling element of the parked trailer. The height may for example be estimated by the towing vehicle based on input from a height level sensor of the towing vehicle and a predetermined offset between the height level sensor and an automatic trailer coupling device of the towing vehicle. The estimated height may be taken into account when positioning the towing vehicle in the position in which the parked trailer can be automatically coupled to the towing vehicle, for example by automatically adjusting an air suspension of the towing vehicle so that the height of the automatic trailer coupling device of the towing vehicle matches the height of the coupling element of the parked trailer matches.

The data storage device may be a local data storage device on the trailer. The local data storage device may for example be a memory on the trailer.

The data storage device may be a local data storage device on the trailer or a remote data storage device. The remote data storage device may for example be a cloud memory or cloud storage.

The towing vehicle may comprise communications means adapted to wirelessly transmit the estimated position and heading of the coupling element to the data storage device, for example via Bluetooth, WiFi, or a mobile telecommunications network (such as 4G or 5G). Likewise, the communications means may be adapted to wirelessly receive the estimated position and heading of the coupling element from the data storage device.

An identifier of the parked trailer may be stored in the data storage device along with the position and heading of the coupling element of the parked trailer. The identifier stored in the data storage device along with the position and heading of the coupling element may be used by the towing vehicle in order to find a particular parked trailer. The identifier may for example be a unique number or string of characters.

The method may further comprise the step of automatically activating a landing gear of the trailer before automatically uncoupling the trailer from the towing vehicle. This eliminates manual cranking of the landing gear, and it is a further step towards full automation in conjunction with uncoupling/coupling of a trailer.

The method may further comprise the step of automatically deactivating a landing gear of the trailer after automatically coupling the trailer to the towing vehicle. This eliminates manual raising of the landing gear, and it is a further step towards full automation in conjunction with uncoupling/coupling of a trailer.

The trailer may be parked in a logistics terminal. The logistics terminal may comprise the aforementioned DGPS reference station According to the second aspect of the invention, there is provided a method comprising the steps of: receiving in a towing vehicle a position and heading of a coupling element of a parked trailer from a data storage device; based on the received position and heading of the coupling element of the parked trailer, positioning the towing vehicle in a position in which the parked trailer can be automatically coupled to the towing vehicle; automatically coupling the trailer to the towing vehicle; and driving away the trailer by means of the towing vehicle. This aspect may exhibit the same or similar features and/or technical effects as the first aspect of the invention. It should be noted that the methods of the first and second aspects may be interrelated: claim 1 may define the invention from the perspective of a towing vehicle parking the trailer, whereas claim 17 may define the invention from the perspective of a towing vehicle picking up the trailer.

The invention also relates to a computer program comprising program code means for performing the steps of the first or second aspect of the invention when said program is run on a computer.

The invention also relates to a computer readable medium carrying a computer program comprising program code means for performing the steps of the first or second aspect of the invention when said program product is run on a computer.

The invention also relates to a control unit configured to perform the steps of the first or second aspect of the invention. The control unit may be included in the towing vehicle.

The invention also relates to a vehicle configured to perform the steps of the first or second aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
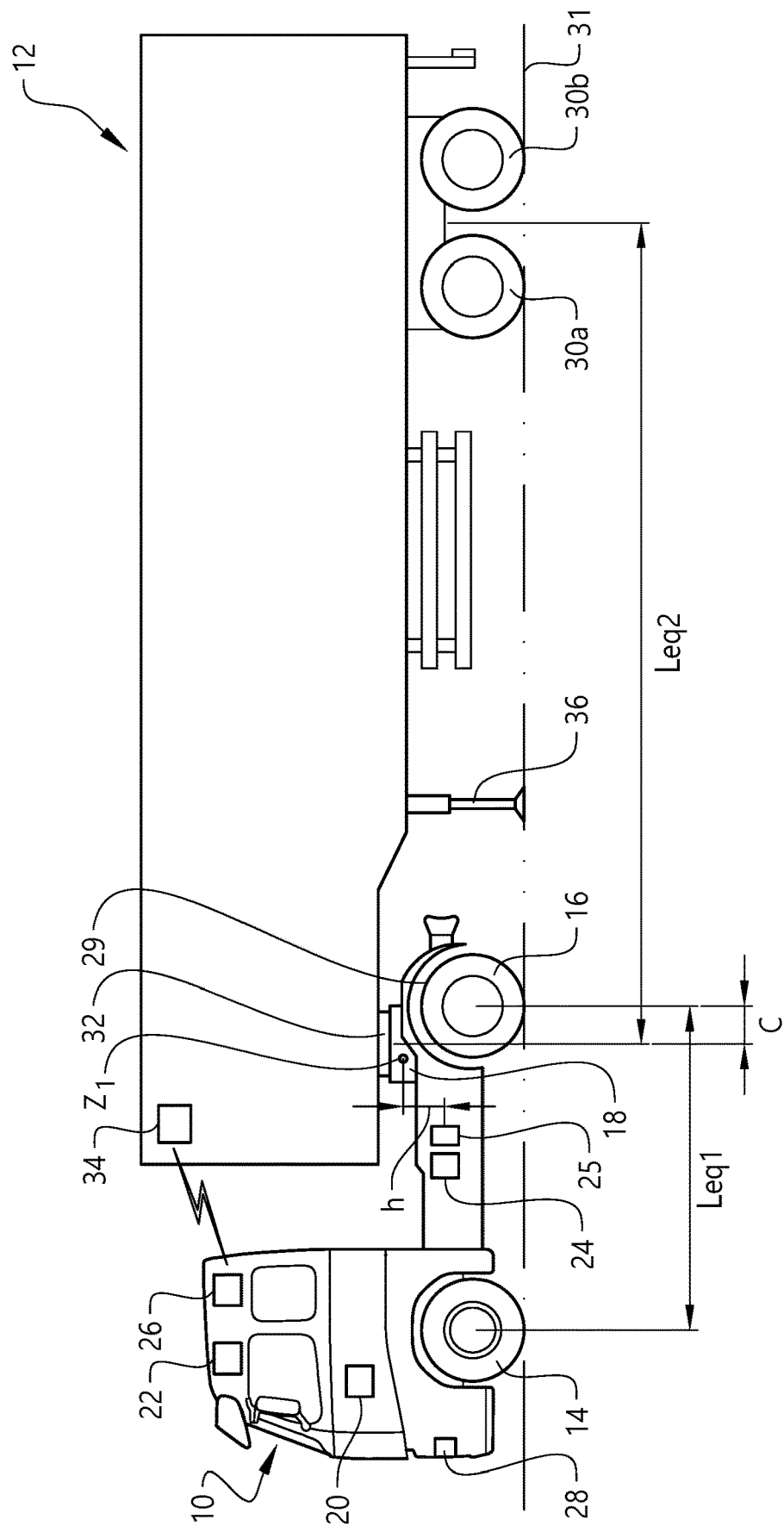
FIG. 1 is a schematic side view of a towing vehicle and trailer incorporating at least one aspect of the invention.

FIG. 1 is a schematic side view of a towing vehicle 10 and trailer 12 incorporating at least one aspect of the invention. Vehicle 10 is here called a towing vehicle even though it in some steps is not towing the trailer 12.

In FIG. 1 the towing vehicle 10 is a tractor, and the trailer 12 is a semi-trailer. However, various other towing vehicle and trailer combinations are possible within the context of the invention, some of which are illustrated in FIGS. 5a-d. When the trailer 12 is mechanically coupled to the towing vehicle 10, they may together be referred to as an articulated vehicle.

The towing vehicle 10 comprises a front wheel axle 14, a rear wheel axle 16, an automatic trailer coupling device 18—here including a fifth wheel, automatic reverse assistance means 20, a GPS navigation system 22, an articulation angle detection means 24, a height level sensor 25, and communication means 26. The articulation angle detection means 24 may for example comprise an articulation angle sensor, or a camera or lidar for camera/lidar based angle sensing. The towing vehicle 10 may also comprise surrounding sensors 28. The towing vehicle 10 may also comprise air suspension 29. The towing vehicle 10 may also comprise a control unit (not shown) adapted to control various steps/operations as described in the following. The road surface is designated with reference sign 31.

The trailer 12 comprises two rear axles 30a-b, a coupling element 32 here in the form of a kingpin connectable to the fifth wheel of the automatic trailer coupling device 18, a local data storage device (memory) 34, and an automatically activable landing gear 36.

Figure 2A:
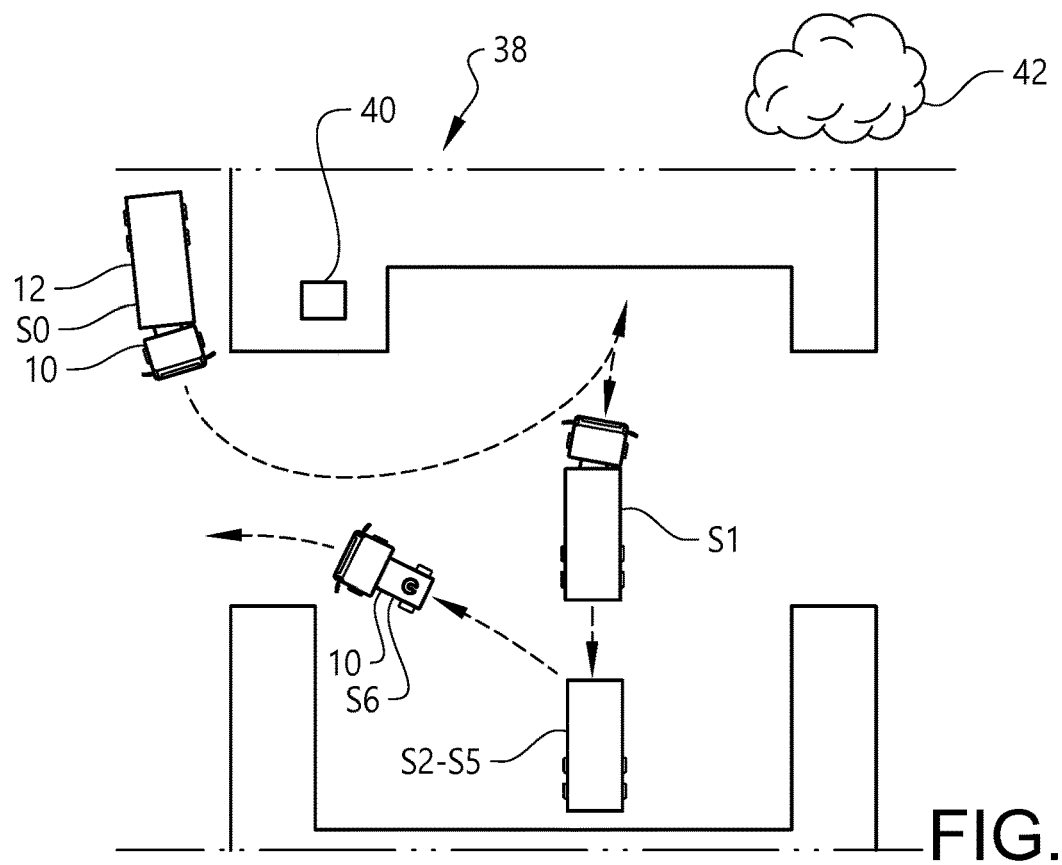
FIG. 2a-b are top views of a logistics terminal in which the trailer of FIG. 1 may be parked.
Figure 2B:
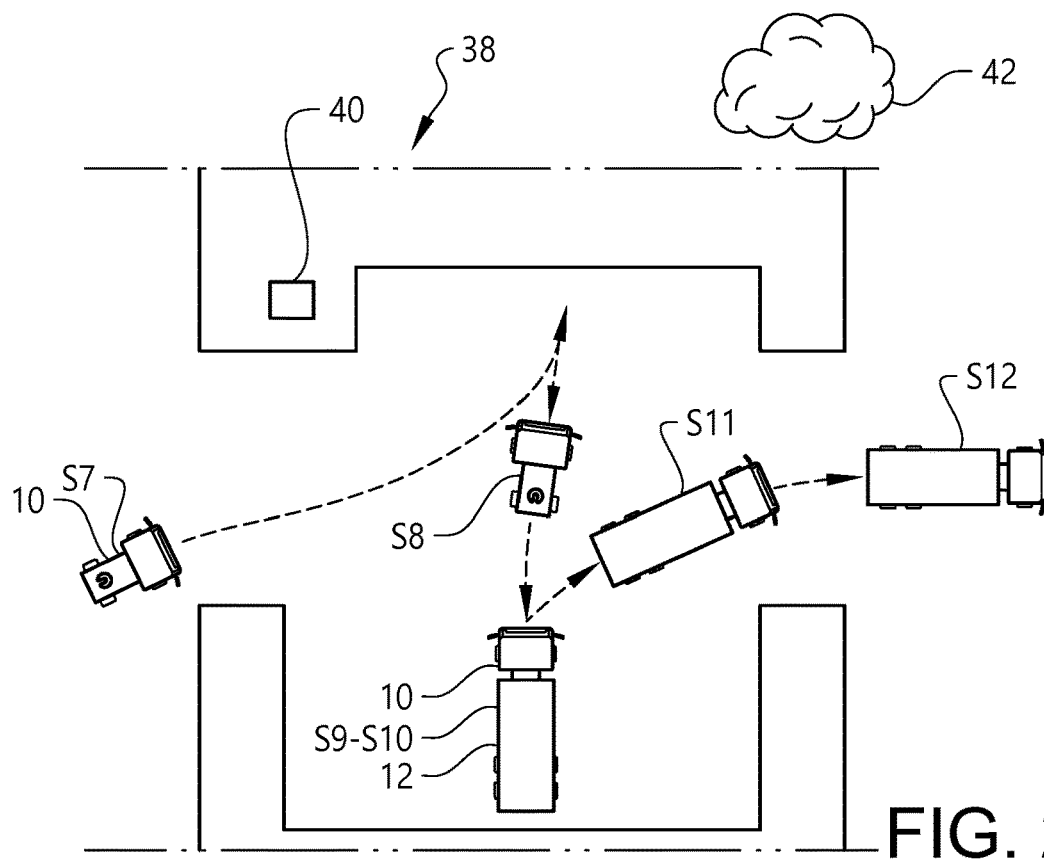
Figure 3:
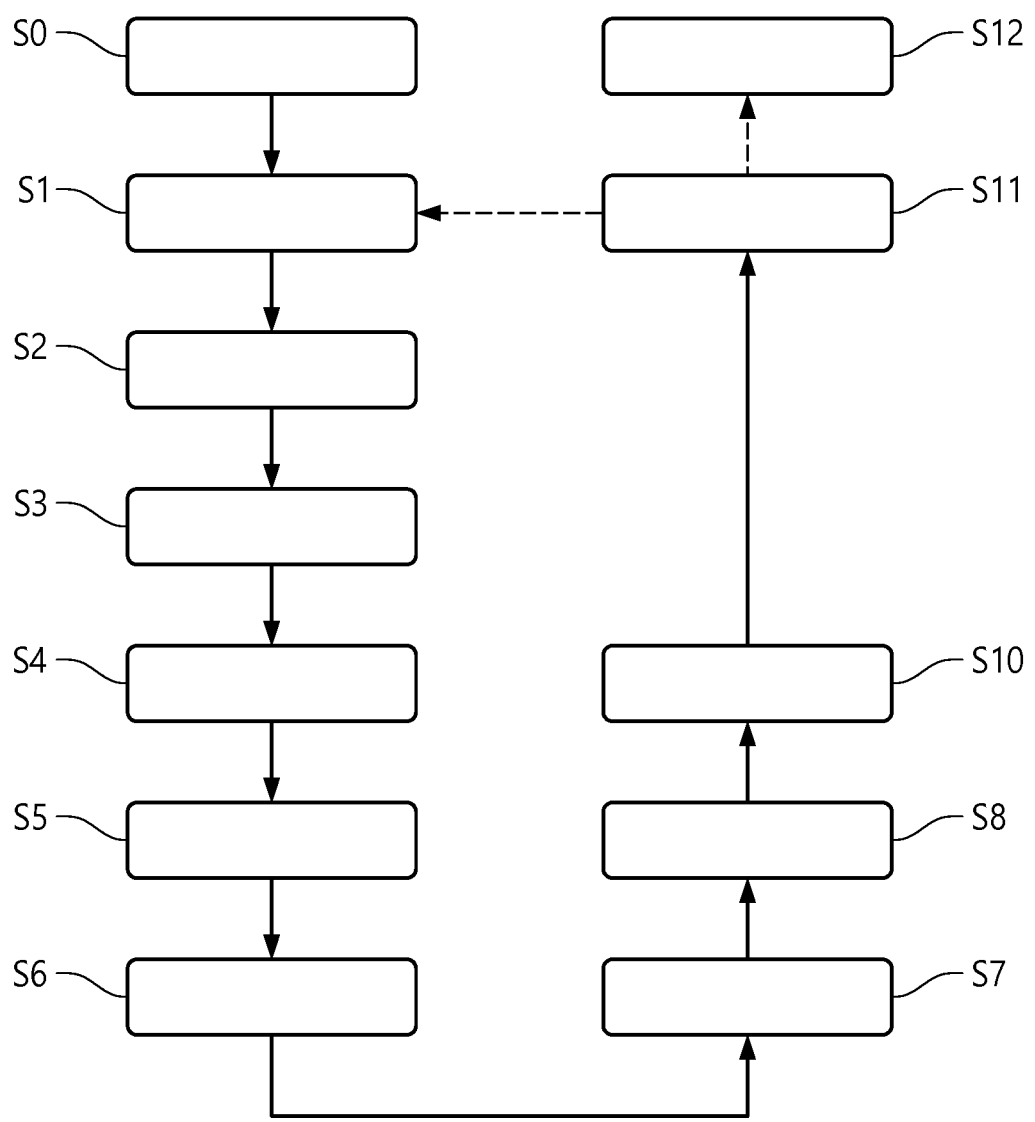
FIG. 3 is a flow chart of a method according to one or more embodiments of the present invention.

With further reference to FIGS. 2a-b and 3, the towing vehicle 10 and trailer 12 of FIG. 1 may enter (step S0) a logistics terminal 38.

The towing vehicle 10 then parks (step S1) the trailer 12 at a desired position. The desired position may include last trailer axle position and heading of trailer. The towing vehicle 10 may receive the desired position from the logistics terminal 38. The trailer 12 may be parked using the automatic reverse assistance means 20, as described in the aforementioned WO 2014/185828 A1, wherein the automatic reverse assistance means is configured to automatically control steering of the towing vehicle 10 when reversing the towing vehicle 10 in order to park the trailer 12. Alternatively, the trailer 12 could be parked by a driver manually driving the towing vehicle 10, or by fully automated (autonomous) driving of the towing vehicle 10.

Once the trailer 12 is parked in the desired position in the logistics terminal 38, the towing vehicle 10 estimates (step S2) position and heading of the coupling element 32 of the now parked (i.e. stationary) trailer 12. The estimated position and heading may be in a horizontal plane or a plane parallel to the road surface 31. The estimated position and heading of the coupling element 32 may be the absolute position and heading of the coupling element 32 of the parked trailer 12.

The position of the coupling element 32 and the heading of the coupling element 32 may be estimated based on the heading of a foremost unit of the towing vehicle 10 (in this case the 'foremost unit' is the tractor 10) as determined by the GPS navigation system 22, the position of a part of the foremost unit of the towing vehicle 10 as determined by the GPS navigation system 22, a linear single track vehicle model representing the towing vehicle 10 and the trailer 12, and the articulation angle between the towing vehicle 10 and the trailer 12 as detected by the articulation angle detection means 24. A DGPS reference station 40 at the logistics terminal 38 may improve the location accuracy of the GPS navigation system 22 to an accuracy of +/−5 cm. Alternatively or complementary, the heading of the foremost unit of the towing vehicle 10 and the position of the part of the foremost unit of the towing vehicle 10 may be determined by means of map localization using the surrounding sensors 28. The surrounding sensors 28 may read the environment of the towing vehicle 10, and the towing vehicle 10 may be configured to compare the reading with a pre-recorded map of the environment to determine or estimate where the towing vehicle 10 is positioned and in what direction it is pointing (i.e. the heading).

Figure 4:
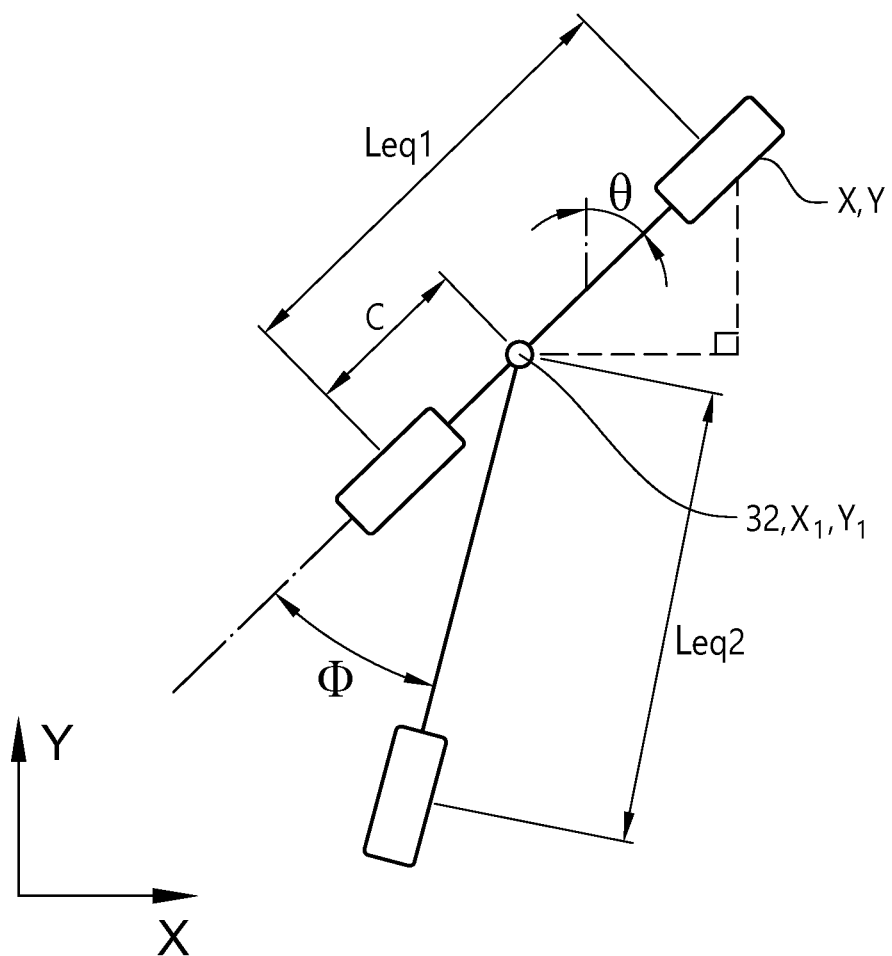
FIG. 4 illustrates a linear single track vehicle model of the towing vehicle and trailer of FIG. 1.

With further reference to FIG. 4, the linear single track vehicle model representing the towing vehicle 10 and the trailer 12 defines so-called equivalent wheelbases $L_{eq1}$, $L_{eq2}$ for the towing vehicle 10 and the trailer 12. The equivalent wheelbases $L_{eq1}$, $L_{eq2}$ are also shown in FIG. 1. Furthermore, the linear single track vehicle model defines a coupling position C representing the fifth wheel/kingpin 32. The coupling position C is expressed as a linear distance relative to the equivalent wheelbase $L_{eq1}$ of the towing vehicle 10. The coupling position C is also shown in FIG. 1. Furthermore in FIG. 4, θ designates the determined heading of the towing vehicle 10, and φ designates the detected articulation angle between the towing vehicle 10 and the trailer 12. The heading of the coupling element 32, which here is equal to the heading of the trailer 12, is θ−φ, for example 30 degrees−20 degrees=10 degrees. The position $(X_1, Y_1)$ of the coupling element 32 given the determined position (X, Y) of a part of the towing vehicle 10 is:

$$X_1 = X - (L_{eq1} - C) * \sin\theta$$

$$Y_1 = Y - (L_{eq1} - C) * \cos\theta$$

The towing vehicle 10 may also estimate the height $Z_1$ of the coupling element of the parked trailer 12, see FIG. 1. The height $Z_1$ may for example be estimated based on input from the height level sensor 25 and a predetermined offset h between the height level sensor 25 and the automatic trailer coupling device 18.

The estimated position ($X_1$, $Y_1$) and heading of the coupling element 32, and optionally the estimated height $Z_1$, is wirelessly transmitted (step S3) using the communication means 26 to the local data storage device 34 of the trailer 12. Alternatively or complementary, the estimated position and heading (and height) of the coupling element 32 may be wirelessly transmitted using the communication means 26 to a remote data storage device such as cloud memory 42. An identifier, for example a unique number or string of characters, of the trailer 12 is stored along with the position and heading (and height) of the coupling element 32 in the local data storage device 34 and/or the cloud memory 42.

Before the trailer 12 is automatically uncoupled, its landing gear 36 is automatically activated in step S4, i.e. the landing gear 36 is automatically lowered.

The trailer 12 may then be automatically uncoupled from the towing vehicle 10 (step S5), after which the towing vehicle 10 drives away from the parked trailer 12 (step S6). Automatically uncoupling the trailer 12 from the towing vehicle 10 may not only include mechanically releasing the coupling element (kingpin) 32 from the automatic trailer coupling device (fifth wheel) 18, but it may also include automatically disconnecting air, electricity, etc. Although this automatic uncoupling does not require manual intervention, it could nevertheless be initiated manually by the driver. Furthermore, the towing vehicle 10 may be driven away manually or automatically or partly automatically.

When the trailer 12 shall be picked up, the towing vehicle 10 receives (step S7) the position and heading (and optionally the height) of the coupling element 32 of the parked trailer 12 from the local data storage device 34 or the remote data storage device 42. In the former case, the trailer 12 may include a wakeup functionality, so it can send the position to the towing vehicle 10. The position and heading (and height) of the coupling element 32 may be wirelessly received via the communications means 26. The towing vehicle 10 picking up the trailer 12 may be the same as the towing vehicle that parked the trailer, or it may be a different towing vehicle. Likewise, a towing vehicle 10 may pick up a different trailer than the trailer it most recently parked.

Based on the received position and heading of the coupling element 32 of the parked trailer 12, the towing vehicle 10 is positioned (step S8) in a position in which the parked trailer 12 can be automatically coupled to the towing vehicle 10. In this position in which the parked trailer 12 can be automatically coupled to the towing vehicle 10, the coupling position $X_1$, $Y_1$ defined in the linear single track vehicle model representing the towing vehicle 10 should match the position of the received position of the coupling element 32, and the heading of the towing vehicle 10 (or the heading of the last unit of the towing vehicle 10 in case the towing vehicle itself is an articulated vehicle) should match—or at least be within a predetermined or allowed range of—the received heading of the coupling element 32. The towing vehicle 12 may be positioned using the automatic reverse assistance means 20, as described in the aforementioned WO 2014/185828 A1, wherein the automatic reverse assistance means 20 is configured to automatically control steering of the towing vehicle 10 when reversing the towing vehicle 10 towards the parked trailer 12. Alternatively, the towing vehicle 12 could be positioned by fully automated (autonomous) driving of the towing vehicle 10. The height of the automatic trailer coupling device 18 may be matched to the height $Z_1$, for example by automatically adjusting the air suspension 29 of the towing vehicle 10.

The trailer 12 may then be automatically coupled (step S9) to the towing vehicle 10. Automatically coupling the trailer 12 to the towing vehicle 10 may not only include mechanically connecting the coupling element (kingpin) 32 to the automatic trailer coupling device (fifth wheel) 18, but it may also include automatically connecting air, electricity, etc. Although this automatic coupling does not require manual intervention, it could nevertheless be initiated manually by the driver.

After the trailer 12 is automatically coupled to the towing vehicle 10, the landing gear 36 of the trailer 12 may be automatically deactivated in step S10, i.e. the landing gear 36 is automatically raised.

The towing vehicle 10 may then drive away with the trailer 12 (step S11), manually or automatically or partly automatically. The towing vehicle 10 and trailer 12 may exit the logistics terminal 38 (step S12), or the towing vehicle 10 may park the trailer 12 at a new position inside the logistics terminal 38 (back to step S1).

FIGS. 5a-d are schematic top views of a number of other combinations of towing vehicle 10 and trailer 12 that may be used in the above-described method(s).

Figure 5A:
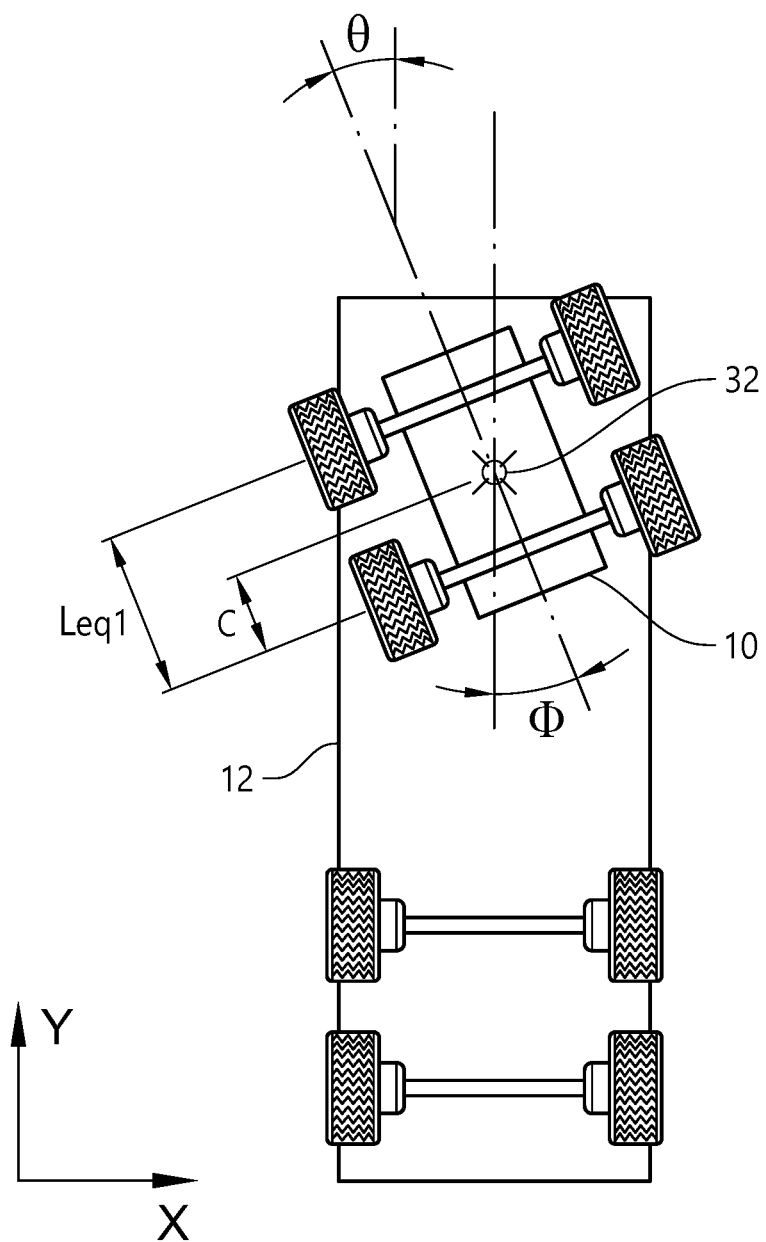
FIG. 5a illustrates an autonomous dolly+semi-trailer.

In FIG. 5a, the towing vehicle 10 is an autonomous dolly, and the trailer 12 is a semi-trailer. The autonomous dolly does not have a human driver, i.e. it is driverless or self-driving. The autonomous dolly may be an electric vehicle comprising an electric motor for propulsion, a power source (battery) for the electric motor, the automatic trailer coupling device including a fifth wheel, steering capability, braking capability, but no cab.

Figure 5B:
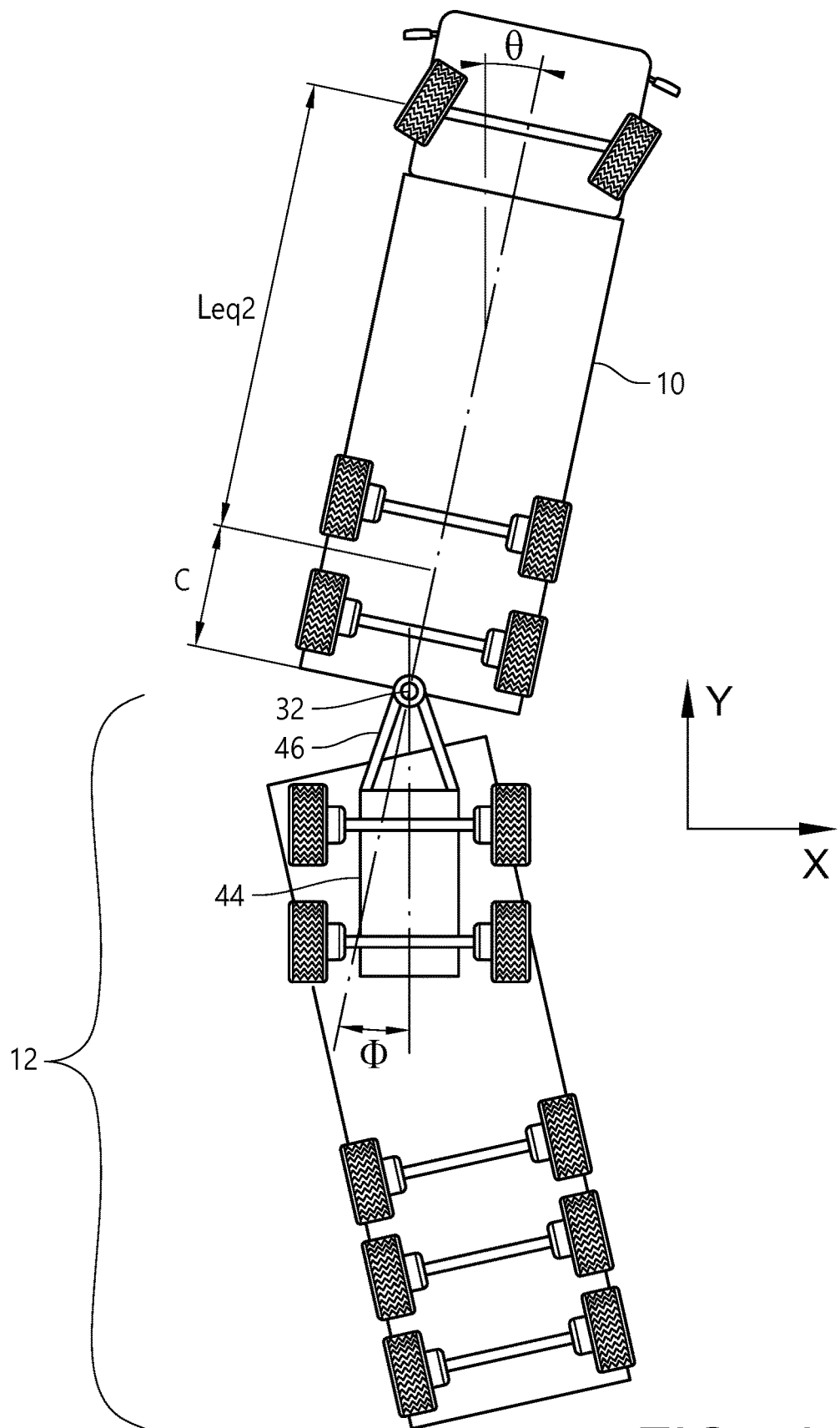
FIG. 5b illustrates a truck+full trailer.

In FIG. 5b, the towing vehicle 10 is a truck, and the trailer 12 is a full trailer. The full trailer comprises a dolly 44 with a drawbar 46. The coupling element 32 may here be a drawbar coupling element, for example a drawbar eye attached to or forming part of the drawbar 46, which drawbar eye is connectable to the automatic trailer coupling device 18 of the towing vehicle 10. The heading of the coupling element 32 is here equal to the overall heading of the drawbar 46. In the illustrated example, the heading of the coupling element 32 is approximately 0 degrees ($\theta$–$\phi$). Also, with the combination of FIG. 5b, there is no need of automatically activating/deactivating any landing gear.

Figure 5C:
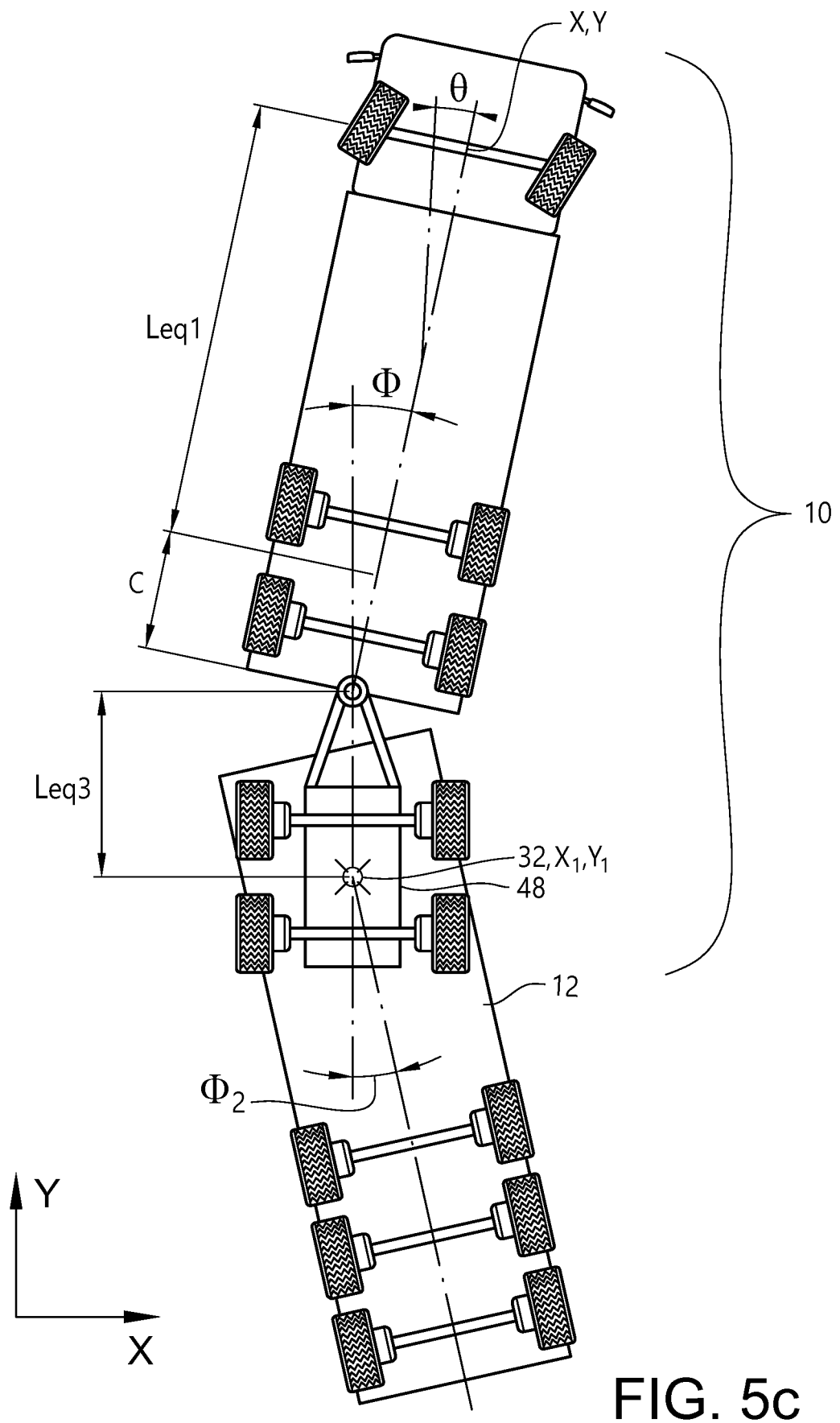
FIG. 5c illustrates a truck+converter dolly+semi-trailer.

FIG. 5c illustrates a truck+converter dolly+semi-trailer, wherein the semi-trailer is parked without the converter dolly (designated by reference sign 48). In this case, the towing vehicle 10 is the truck+converter, and the trailer 12 is the semi-trailer. Hence, the towing vehicle 10 is here an articulated vehicle. This means that when estimating the position and heading of the coupling element 32 of the parked trailer 12, an additional articulation angle $\phi_2$ between the converter dolly 48 and the trailer 12 as well as the equivalent wheelbase $L_{eq3}$ of the converter dolly 48 should be taken into account, as shown in FIG. 5c. The additional articulation angle $\phi_2$ may be detected by an additional articulation angle detection means. In the illustrated example, the heading of the coupling element 32 ($\theta$–$\phi$–$\phi_2$) is approximately 10–10–20=–20 degrees. Furthermore, the position ($X_1$, $Y_1$) of the coupling element 32 given the determined position (X, Y) of a part of the foremost unit of the towing vehicle 10 is:

$$X_1 = X - (L_{eq1} + C) * \sin\theta - (L_{eq3}) * \sin(\theta - \phi)$$

$$Y_1 = Y - (L_{eq1} + C) * \cos\theta - (L_{eq3}) * \cos(\theta - \phi)$$

It is noted that if the semi-trailer is parked with the converter dolly 48, the situation would be the same as in FIG. 5*b*.

Figure 5D:
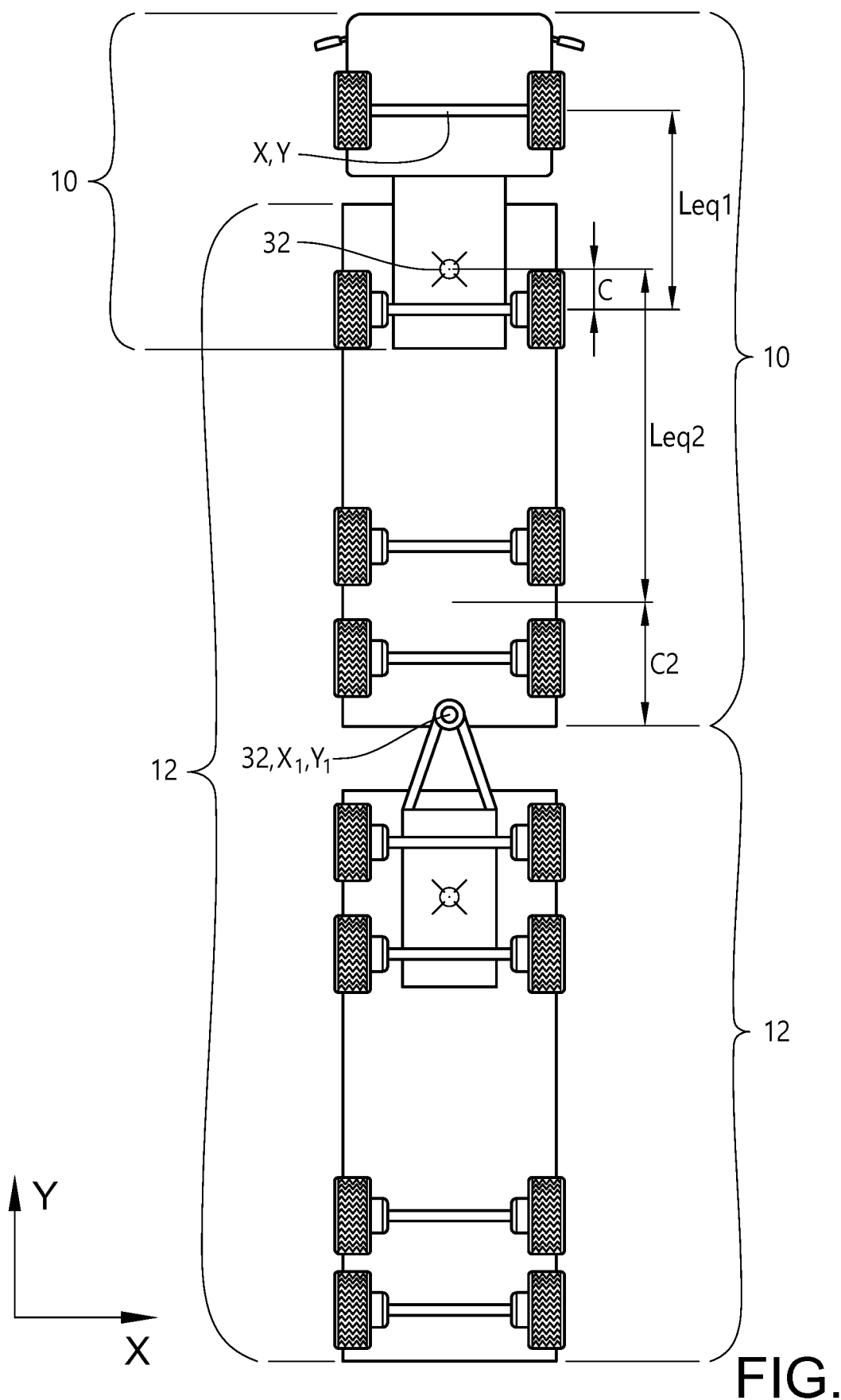
FIG. 5d illustrate a tractor+semi-trailer+full trailer.

FIG. 5*d* illustrates a tractor+semi-trailer+full trailer. In case the semi-trailer+full trailer are parked together ("left" variant in FIG. 5*d*), i.e. the coupling between the tractor and the semi-trailer is disconnected, the situation would basically be the same as in FIG. 4, albeit the heading of the coupling element 32 would specifically be equal to the heading of the foremost unit—i.e. the semi-trailer—of the trailer 12. On the other hand, if only the full trailer is parked ("right" variant in FIG. 5*d*), the articulation angle $\phi_2$ between the semi-trailer and the full trailer, the equivalent wheelbase $L_{eq2}$ of the semi-trailer, and the coupling position $C_2$ of the semi-trailer should be taken into account when estimating the position and heading of the coupling element (drawbar coupling element) 32 of the parked trailer 12, in addition to the heading θ of the tractor, the articulation angle ϕ between the tractor and the semi-trailer, the equivalent wheelbases $L_{eq1}$ of the tractor, and the coupling position C of the tractor. In the illustrated example (FIG. 5*d*; "right" variant"), θ=ϕ=$\phi_2$=0, whereby the heading of the coupling element 32 is approximately 0 degrees. Furthermore, the position ($X_1$, $Y_1$) of the coupling element 32 given the determined position (X, Y) of a part of the foremost unit of the towing vehicle 10 is:

$$X_1 = X - (L_{eq1} - C)*\sin\theta - (L_{eq3} + C_2)*\sin(\theta - \phi)$$

$$Y_1 = Y - (L_{eq1} - C)*\cos\theta - (L_{eq3} + C_2)*\cos(\theta - \phi)$$

It is to be understood that the present invention is not limited to the embodiments described above and illustrated in the drawings; rather, the skilled person will recognize that many changes and modifications may be made within the scope of the appended claims.

The invention claimed is:

1. A method comprising the steps of: parking a trailer by means of a towing vehicle, which trailer is coupled to the towing vehicle via a coupling element of the trailer; and automatically uncoupling the trailer from the towing vehicle, so that the towing vehicle can drive away from the parked trailer, characterized by the towing vehicle estimating position and heading of the coupling element of the parked trailer; and transmitting the estimated position and heading of the coupling element of the parked trailer to a data storage device.

2. A method according to claim 1, further comprising the steps of:
receiving in a towing vehicle the position and heading of the coupling element of the parked trailer from the data storage device; based on the received position and heading of the coupling element of the parked trailer, positioning the towing vehicle in a position in which the parked trailer can be automatically coupled to the towing vehicle; automatically coupling the trailer to the towing vehicle; and driving away the trailer by means of the towing vehicle.

3. A method according to claim 2, wherein positioning the towing vehicle in a position in which the parked trailer can be automatically coupled to the towing vehicle includes automatically controlling at least steering of the towing vehicle when reversing the towing vehicle towards the parked trailer.

4. A method according to claim 2, further comprising the step of automatically deactivating a landing gear of the trailer after automatically coupling the trailer to the towing vehicle.

5. A method according to claim 1, wherein the coupling element of the trailer is a kingpin.

6. A method according to claim 1, wherein the coupling element of the trailer is a drawbar coupling element.

7. A method according to claim 1, wherein the position and heading of the coupling element of the parked trailer is estimated based on the heading of a foremost unit of the towing vehicle, the position of a part of the foremost unit of the towing vehicle, a vehicle model representing the towing vehicle and the trailer, and at least the articulation angle between the towing vehicle and the trailer as detected by at least one articulation angle detection means.

8. A method according to claim 7, wherein the vehicle model is a linear single track vehicle model in which at least one wheelbase and at least the coupling position between the towing vehicle and the trailer are defined.

9. A method according to claim 7, wherein the heading of the foremost unit of the towing vehicle and the position of the part of the foremost unit of the towing vehicle are determined by a navigation system of the towing vehicle.

10. A method according to claim 7, wherein the heading of the foremost unit of the towing vehicle and the position of the part of the foremost unit of the towing vehicle are determined by means of map localization using at least one sensor on the towing vehicle.

11. A method according to claim 1, further comprising the step of estimating the height of the coupling element of the parked trailer before automatically uncoupling the trailer from the towing vehicle, wherein the height is stored in the data storage device along with said position and heading of the coupling element of the parked trailer.

12. A method according to claim 1, wherein the data storage device is a local data storage device on the trailer.

13. A method according to claim 1, wherein the data storage device is a remote data storage device.

14. A method according to claim 1, wherein an identifier of the parked trailer is stored in the data storage device along with the position and heading of the coupling element of the parked trailer.

15. A method according to claim 1, further comprising the step of automatically activating a landing gear of the trailer before automatically uncoupling the trailer from the towing vehicle.

16. A method according to claim 1, wherein the trailer is parked in a logistics terminal.

17. A computer program comprising program code for performing the steps of claim 1 when said program code is run on a computer.

18. A computer readable medium carrying a computer program comprising program code for performing the steps of claim 1 when said program code is run on a computer.

19. A control unit configured to perform the steps of the method according to claim 1.

20. A vehicle configured to perform the steps of the method according to claim 1.

* * * * *